No. 627,464. Patented June 27, 1899.
H. W. ABBOTT.
AUTOMATIC WEIGHING MACHINE.
(Application filed Apr. 28, 1898.)
(No Model.) 2 Sheets—Sheet 1.
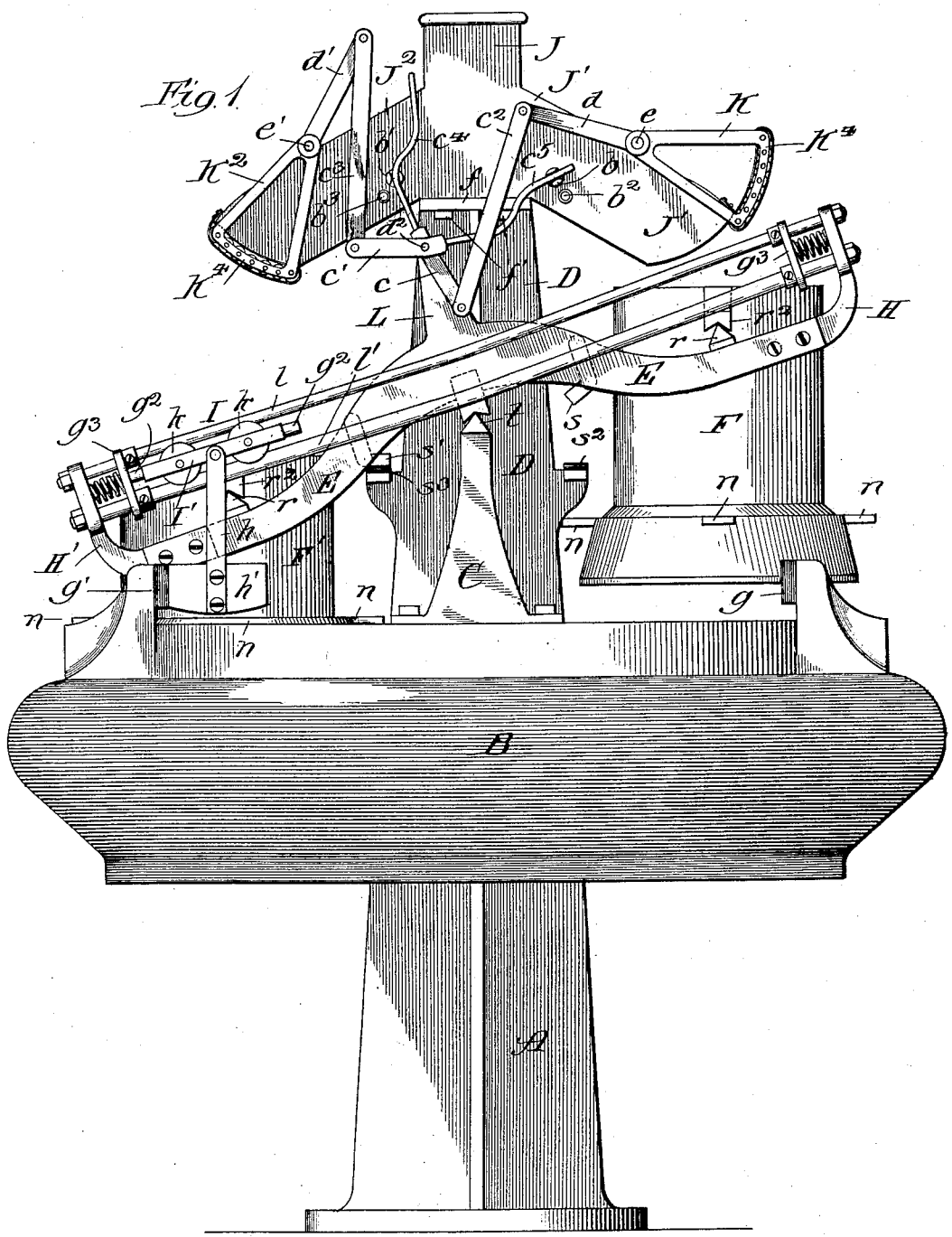

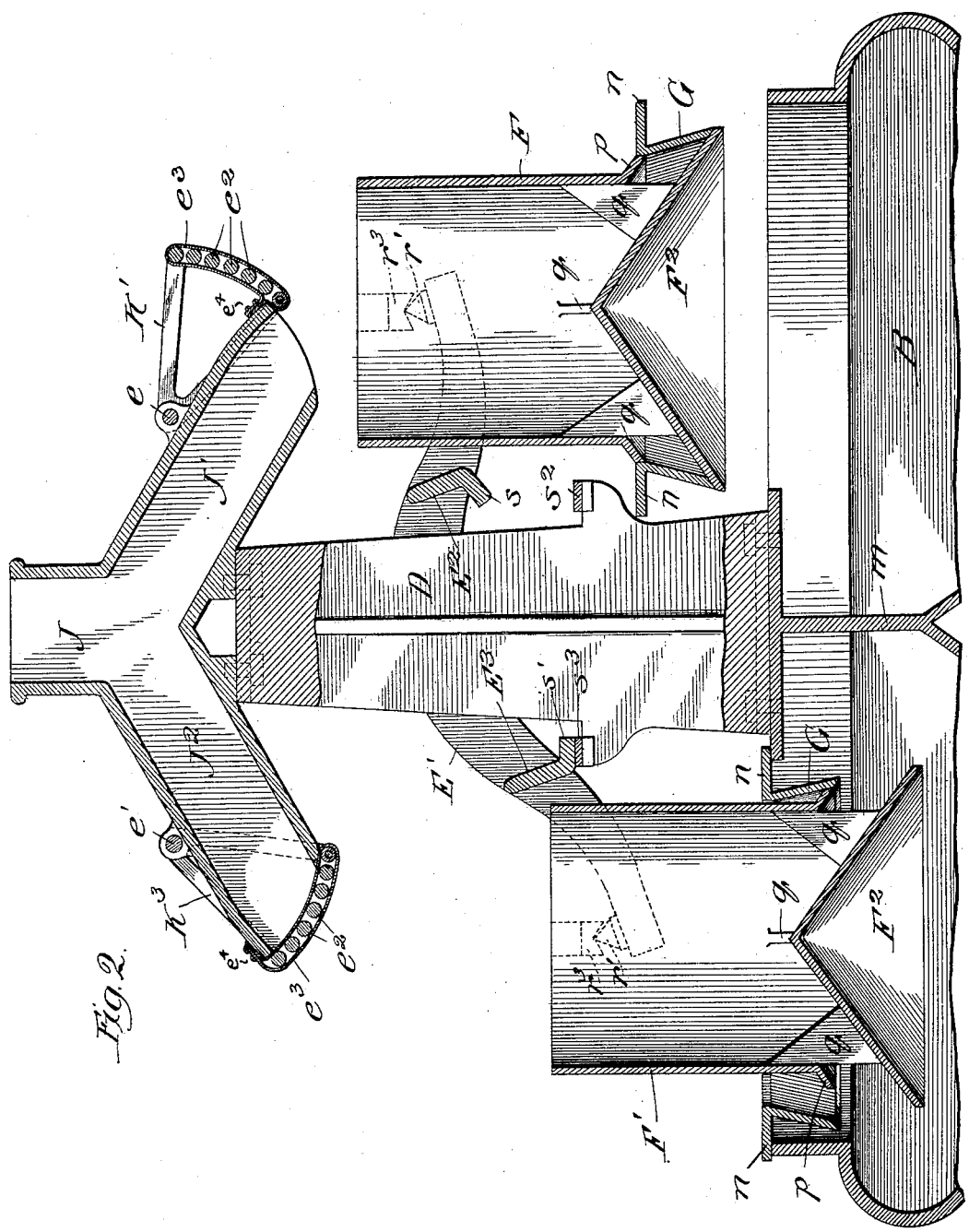

UNITED STATES PATENT OFFICE.

HARRY W. ABBOTT, OF CHICAGO, ILLINOIS.

AUTOMATIC WEIGHING-MACHINE.

SPECIFICATION forming part of Letters Patent No. 627,464, dated June 27, 1899.

Application filed April 28, 1898. Serial No. 679,059. (No model.)

*To all whom it may concern:*

Be it known that I, HARRY W. ABBOTT, a citizen of the United States, residing at Chicago, in the county of Cook and State of Illinois, have invented a new and useful Improvement in Automatic Weighing-Machines, of which the following is a specification.

My invention relates to certain improvements in automatic weighing-machines for weighing small grain, coffee, or any material of a like nature, my object being to produce a machine of this nature of generally improved construction.

More particularly, my invention relates to the means of cut-off employed, to the traveling carriage and shifting weight employed, and to the construction of the weighing vessels employed, providing for the ready dumping of their contents.

Generally stated, the improvements consist in the novel means employed in effecting the closure of the ports leading to the weighing vessels, in the novel construction of the weighing vessels themselves, and in the various novel combinations of parts hereinafter set forth.

In the accompanying drawings, Figure 1 is a view in front elevation of an automatic weighing-scale embodying my improvements, and Fig. 2 an enlarged broken vertical section taken parallel to the plane of the paper of Fig. 1.

A is a base-standard, upon which is supported in any convenient manner an expanded horizontally-disposed frame portion B, which in turn supports the beam-standards C and a spout-supporting standard D.

Upon the standards C (the rear one of which is hidden by the standard D) on knife-edges $t$ is balanced a double-member scale-beam composed of a front member E and a rear member E'. The members E and E' are connected by cross-pieces $E^2$ and $E^3$, which carry projections $s s'$, which strike against stops $s^2 s^3$, of suitable material, upon the standard D to limit the swing of the scale-beam. The front and rear members E and E' are provided with knife-edges $r$ and $r'$, respectively, which fit in V-shaped bearings $r^2 r^3$ on the weighing vessels F and F'.

The vessels F and F', which may be of circular or rectangular cross-section, are provided with conical or pyramidal bottoms $F^2$, secured to the vertical portions by triangular blocks $q$, the whole preferably being cast integral. The bottom of each vessel is of greater diameter than the vessel itself and receives upon the outer periphery of its conical surface the lower edge of an upwardly-converging sleeve G, which bears normally at its sloping upper inner margin against the inclined lower edge of an annular flaring collar or offset $p$. The sleeves G, which are preferably of aluminium, are provided with outwardly-extending projections $n$, which serve to raise each sleeve relatively to its vessel as the vessel descends into the horizontal portion of the frame through an opening of suitable size and shape.

The hollow horizontally-disposed frame portion B is divided transversely by a partition $m$, and the two chambers thus formed may lead to common or separate receiving vessels.

The ends of the front member E of the scale-beam project beyond the knife-edges $r$ and have secured to them upturned pieces H H', which carry at their upturned ends a track I, comprising an upper member $l$ and a lower member $l'$, which "dish" or slant downwardly toward the center. Confined between the members $l$ and $l'$ are the grooved wheels or rollers $k$ of a movable carriage I'. From the central portions of the side pieces of the carriage-frame depend pivotally-supported links or arms $h$, which carry suspended at their lower ends a weight or balance $h'$. Rubber-plated buffers $g g'$ on the frame portion B serve to receive the shock of the weight as it shifts from end to end on the track. The carriage-frame is provided at its ends with bumpers $g^2$, which strike against spring-held buffer-plates $g^3$ at the ends of the track.

The top of the standard is supplied with flanges $f$, to which is secured, by means of bolts $f'$, a two-way spout or chute J, having branches J' and $J^2$, with discharge-orifices above the vessels F and F', respectively. At points preferably above the branch chutes and at some distance from the discharge ends thereof on pins $e$ and $e'$, respectively, are pivoted connected triangular frames K K' and $K^2 K^3$. The bases $K^4$ of these triangles are curved in the form of segments of rings, and in them are journaled rollers $e^2$, each set of rollers being loosely inclosed in an apron $e^3$, of cloth, sheet-rubber, or the like, secured at the end margins by means of screws $e^4$ to the lower margin of the upper side of a branch spout. The lower ends of the spouts are cut to lie in the surfaces of cylinders whose axes lie in the pins $e$ and $e'$, and the lowermost roll of each set is of rubber, inclosing a brass shaft, the purpose of which arrangement is to supply a yielding surface for the roll, which contacts with the lower edge of the spout when the aperture is closed to obviate the danger of the device failing to close properly by reason of grain getting between the roll and lower edge of the spout.

The triangular frames K and $K^2$ at the front sides of the branch spouts are supplied with lever-arms $d$ and $d'$, connected by link-and-lever mechanism with what may be termed an "index" or "branch" arm L, which projects upwardly from the central portion of the front member E of the scale-beam. To the upper end of the branch arm L are pivoted on a stud $d^2$ levers $c\ c'$, having link connections $c^2\ c^3$ with the ends of the arms $d\ d'$, respectively, and provided at their free ends with curved cam-like extensions $c^4$ and $c^5$, which pass loosely through perforations in rotatable studs $b\ b'$, journaled on the front surfaces of the branch spouts. Rollers $b^2$ and $b^3$ serve to aid in guiding the tortuous lever extensions through the rotatable studs.

The operation of the scale is as follows: The material to be weighed enters from any convenient source through the chute J, and the spout $J^2$, being closed, is directed to the discharge-spout $J'$. As the vessel F becomes filled it lowers against the resistance of the weight or counterpoise $h'$, the center of gravity of which is kept at the farthest possible distance from the center of the beam by reason of its pivotal connection with the traveling carriage $I'$. As the vessel F sinks the first movement of the connected frames K K', which carry the rollers and apron, serving to close the spout $J'$, is comparatively slow. By the time the scale-beam has moved through one-fourth of its arc of travel, with the cams and location of parts as herein shown, the base $K^4$ of the triangle K has moved approximately five-twelfths of the distance across the opening. By the time the beam has become level the closure has become complete and the other discharge-valve is about to open. At this instant the inclination of that portion of the track whereon the carriage is located becomes such that the carriage is moved by gravity quickly to the opposite end of the track, thereby causing the vessel F to be quickly depressed, the vessel F' to be raised, and the valve at the discharge end of the spout $J^2$ to be thrown completely open. In the descent of the vessel F the lugs $n$ on the sleeve G are engaged by the frame portion B, while the vessel itself sinks through the opening provided for it. Thus the annular valve is moved from the annular discharge-orifice of the vessel F and the material is allowed to escape. The action of the rolls $e^2$ of the valve is to lay succeeding portions of the apron in the path of the descending material, avoiding a sliding motion and the friction incident thereto. The vessel F is limited in its downward movement by the projection $s$ striking against the stop $s^2$.

By means of suitable connection between what I have termed the "free" ends of the levers $c$ and $c'$ and the standard D, I am enabled to regulate at will the rapidity of movement of the discharge-valves at different periods during the movement, thereby enabling the best effect to be obtained. The whole arrangement is such as to reduce the friction to a minimum, and remarkably accurate results have been attained in practice.

The form of valve here shown is believed to be entirely novel and is not to be limited in its use to a weighing-machine.

Various changes within the spirit of my invention may be made without departure from my invention. Hence I wish to be understood as intending no limitation by the above particular description except as shall appear from the appended claims. It would be within the spirit of my invention, for instance, to dispense with one of the buckets, its spout, and the valve therefor, replacing the bucket with a suitable counterweight, and thereby rendering the machine single-acting instead of double-acting.

What I claim as new, and desire to secure by Letters Patent, is—

1. In an automatic machine, the combination of a frame, a scale-beam supported thereon, a bucket carried by said beam, a spout having a discharge above said bucket, a valve-carrying lever pivotally supported between its ends on said frame, an oscillatory valve carried by said lever, a lever pivotally joined to a part of said beam, and connecting means between said lever and frame and between said lever and the valve-carrying lever, substantially as and for the purpose set forth.

2. In an automatic weighing-machine, the combination of a frame, a scale-beam supported thereon centrally of its length, buckets carried by said beam, spouts having discharges above said vessels, valve-carrying levers pivotally supported between their ends, valves carried by said levers and moving across said discharge-orifices from top to bottom in closing and in the reverse direction in opening, and link-and-lever mechanism connected with said valve-carrying levers, with the frame, and with said beam for moving the valves, substantially as and for the purpose set forth.

3. In an automatic weighing-machine, the combination of a frame, a scale-beam supported thereon centrally of its length, buckets carried by said beam, spouts having discharge-orifices above said buckets, pivotally-supported valve-carrying levers, valves carried by said levers moving across said orifices, a central branch arm carried by said beam, links pivotally connected at one end with said valve-carrying levers, and means connected with the free ends of said links, with said branch arm, and with said frame, for operating the valve-carrying levers, substantially as and for the purpose set forth.

4. In an automatic weighing-machine, the combination of a frame, a scale-beam supported thereon centrally of its length and provided with a branch arm, vessels carried by said beam, spouts having discharge-orifices above said vessels, a lever pivotally supported on one of said spouts, a valve carried thereby, a lever pivotally connected to said branch arm, a link joining said last-named lever to said valve-carrying lever, means for directing the movement of the free end of the lever carried by the branch arm, a valve for the other spout, and means for operating said valve, substantially as and for the purpose set forth.

5. In an automatic weighing-machine, the combination of a frame, a beam supported thereon, vessels carried by said beam, spouts having discharge-orifices above said vessels, aprons each secured at its end margins to said spouts, suitably-supported rollers within said aprons, and means for moving the rollers across the orifices to close or open the orifices, substantially as and for the purpose set forth.

6. In an automatic weighing-machine, the combination of a frame, a scale-beam supported thereon, vessels carried by the beam, spouts having discharges above said vessels, roller-supporting frames pivotally joined to said spouts, a set of rollers mounted in said pivoted frames at each orifice, lever-arms rigid with the frames, an apron enveloping each set of rollers and attached at its end margins to a spout, and mechanism connected with the scale-beam and with said lever-arms for operating the lever-arms, substantially as and for the purpose set forth.

7. In an automatic weighing-machine, the combination of a frame, a beam supported thereon centrally of its length and provided with a branch arm, vessels carried by said beam, spouts having discharge ends cut to lie in cylindrical surfaces, frames pivotally joined to the spouts, rollers journaled therein, aprons enveloping the rollers and attached at their end margins to the spout ends, lever-arms rigid with said pivoted frames, and link-and-lever mechanism connected with said lever-arms, with the frame, and with said branch arm, substantially as and for the purpose set forth.

8. In an automatic weighing-machine, the combination of a frame, a beam supported thereon centrally of its length and provided with a branch arm, vessels carried by said beam, spouts having discharge ends cut to lie in cylindrical surfaces, frames pivotally joined to the spouts, rollers journaled therein, aprons enveloping the rollers and attached at their end margins to the spout ends, lever-arms rigid with said pivoted frames, links pivotally connected at one end to said lever-arms, levers pivotally joined to said branch arm and to the free ends of said links, cam-like extensions on the levers carried by said branch arm, and means on the frame for engaging said cam extensions, substantially as and for the purpose set forth.

9. A discharge-orifice valve, comprising a frame movably connected with a stationary part adjacent to the orifice, rollers mounted therein, an apron secured at its end margins to a stationary part adjacent to the orifice and enveloping said rollers, and means for operating the roller-bearing frame, substantially as and for the purpose set forth.

10. A discharge-orifice valve, comprising a frame pivoted to a stationary part near the orifice, rollers mounted therein, an apron secured at its end margins to a stationary part adjacent to the orifice and enveloping the rollers, and means for operating said pivoted frame, substantially as and for the purpose set forth.

11. In an automatic weighing-machine, the combination of a frame, a beam supported thereon, vessels carried by said beam provided with bottoms sloping outwardly and downwardly from their centers and of greater diameter than the vertical portions of the vessels, collars or offsets on the vessels near their bottoms between which and the bottoms are discharge-orifices, and sleeve-like valves bearing against said collars and the bottoms and provided with projections for stopping the downward movement of the valves, thereby to open the discharge-orifices of the vessels, substantially as and for the purpose set forth.

12. In an automatic weighing-machine, the combination of a frame, scale-beam, spouts, and valve mechanism supported by the frame, buckets carried by the scale-beam, a track carried directly by the scale-beam, a carriage mounted on said track, and a depending weight or balance pivotally joined to the frame of said carriage, substantially as and for the purpose set forth.

HARRY W. ABBOTT.

In presence of—
DAN W. LEE,
JNO. H. LEE.